United States Patent
Brüning

[11] 3,850,602
[45] Nov. 26, 1974

[54] SALT VAPOR ATMOSPHERE TREATMENT OF QUARTZ CRYSTAL GRANULES

[75] Inventor: Rolf Brüning, Bruchkobel, Germany

[73] Assignee: Heraens-Schott Quarzschmelze GmbH, Hanau/Main, Germany

[22] Filed: Dec. 18, 1972

[21] Appl. No.: 316,312

[30] Foreign Application Priority Data
Jan. 7, 1972 Germany............................ 2205560

[52] U.S. Cl.............................. 65/18, 65/30, 65/32, 65/134, 106/52
[51] Int. Cl. ......................... C03b 23/20, C03b 5/16
[58] Field of Search .................. 65/134, 32, 30, 18; 106/52

[56] References Cited
UNITED STATES PATENTS

| | | | |
|---|---|---|---|
| 2,982,053 | 5/1961 | Elmer | 65/30 X |
| 3,149,946 | 9/1964 | Elmer | 65/32 |
| 3,338,694 | 8/1967 | Davy | 65/134 X |
| 3,459,522 | 8/1969 | Elmer et al. | 65/32 X |
| 3,531,271 | 9/1970 | Dumbaugh, Jr. | 65/134 X |
| 3,531,305 | 9/1970 | Dumbaugh, Jr. | 65/134 X |
| 3,531,306 | 9/1970 | Dumbaugh, Jr. | 65/134 X |

*Primary Examiner*—S. Leon Bashore
*Assistant Examiner*—Frank W. Miga
*Attorney, Agent, or Firm*—Burgess, Dinklage & Sprung

[57] ABSTRACT

Bubble-free and OH-free quartz glass is made from granular quartz crystal by doping quartz crystal granules with a salt whose cation is selected from the group of lithium, sodium, potassium, magnesium, calcium, strontium and silver, and having, at temperatures ranging from 800° to 1,700°C., a vapor pressure of at least 5 mm Hg, preferably of more than 100 mm Hg, or with a mixture of such salts, in a quantity corresponding at least to the OH content of the quartz crystal granules, stirring and doped quartz crystal granules for a period of at least 30 seconds in a reaction chamber heated to a temperature ranging from 800° to 1,700°C. and having an atmosphere enriched with a salt vapor, flooding the stirred quartz crystal granules with a water vapor-free gas at a temperature ranging from 800° to 1,700°C., and melting the gas-flooded quartz crystal granules in a water-vapor-free atmosphere in a known melting furnace.

8 Claims, 2 Drawing Figures ns/p># SALT VAPOR ATMOSPHERE TREATMENT OF QUARTZ CRYSTAL GRANULES

BACKGROUND

This invention relates to a process for the manufacture of bubble-free and OH-free quartz glass from OH-containing quartz crystals in granular form, and apparatus for carrying out the process.

It is known from U.S. Pat. No. 2,982,053, to treat porous glass containing 96 percent silicon dioxide with liquid containing fluorine or a gas containing fluorine and heat it in a water-free atmosphere or in a vacuum for the purpose of removing water or hydroxyl radicals from the glass. Hydrofluoric acid, ammonium fluoride, or fluorides of aromatic hydrocarbons may be ued as the fluorides. According to this patent, chlorides, bromides and iodides have proven ineffective for the purpose of removing water or hydroxyl radicals from the glass.

German Auslegeschrift 1,284,068 discloses a process for the elimination of residual water from a porous glass body having a high silicon dioxide content. The glass is exposed to a gaseous atmosphere containing chlorine, at temperatures ranging from 600° to 1,000°C., for a length of time such that the glass is permeated by this atmosphere and the hydroxyl ions are replaced by chlorine ions. After this the porous glass bodies may be compressed.

German Patent 1,010,636 describes a process for the manufacture of sealed tubes of quartz glass for gas discharge lamps. The quartz glass is treated at a temperature above 1,600°C. with halogens, especially chlorine, or with compounds yielding halogens, in the presence of hydrogen. An important condition of this process is that the halogens, especially chlorine, must be present in an excess.

The manufacture of glass with a low water content is known from British Pat. No. 1,147,830. The glass components are mixed with a chemically reacting chlorine compound and then melted, while a dry atmosphere is maintained over the melt. A number of chlorine compounds are effective including alkali and alkaline-earth chlorides, noble metal chlorides and heavy metal chlorides such as molybdenum chloride, tantalum chloride and tungsten chloride. Reduction of the water content of the glass reduces the absorption of infrared radiation in the wavelength range of 2.75 to 2.95 $\mu$m. It is taught that this process for the treatment of glass cannot be used for the elimination of water from quartz glass or from glass containing 96 percent silicon dioxide, because the addition of a chemically reaction chlorine compound is undesirable.

SUMMARY

An object of this invention is a process which makes it possible, in a simple, inexpensive manner, to produce a bubble-free quartz glass form quartz crystal granules containing hydroxyl radicals, the hydroxyl radical content of the end product being so greatly diminished below that of the starting product that, for all practical purposes, it may be called a "hydroxyl-free" quartz glass.

This object is achieved in a surprising manner according to the invention by (1) doping quartz crystal granules with a salt whose cation is selected from the group of lithium, sodium, potassium, magnesium, calcium, strontium and silver, and having, at temperatures ranging from 800° to 1,700°C., a vapor pressure of at least 5 mm Hg, preferably of more than 100 mm Hg, or with a mixture of such salts, in a quantity corresponding at least to the OH content of the quartz crystal granules, (2) stirring the doped quartz crystal granules for a period of at least 30 seconds in a reaction chamber heated to a temperature ranging from 800° to 1,700°C. and having an atmosphere enriched with salt vapor, (3) flooding the stirred quartz crystal granules with a water vapor-free gas at a temperature ranging from 800° to 1,700°C. and (4) melting the gas-flooded quartz crystal granules in a water vapor-free atmosphere in a known melting furnace.

Apparatus of the invention for making quartz glass from granular quartz crystal includes heated reaction chamber means of quartz glass, heated gas flooding chamber means of quartz glass and means to transfer said granular quartz crystal from said reaction chamber means to said gas flooding chamber means without tranfering substantial amounts of vapor in said reaction chamber means. The reaction chamber is preferably a tube with means to rotate same. The reaction and gas flooding chambers are preferably components of a simple unit with a transfer operative therebetween.

DESCRIPTION

Figure 1:
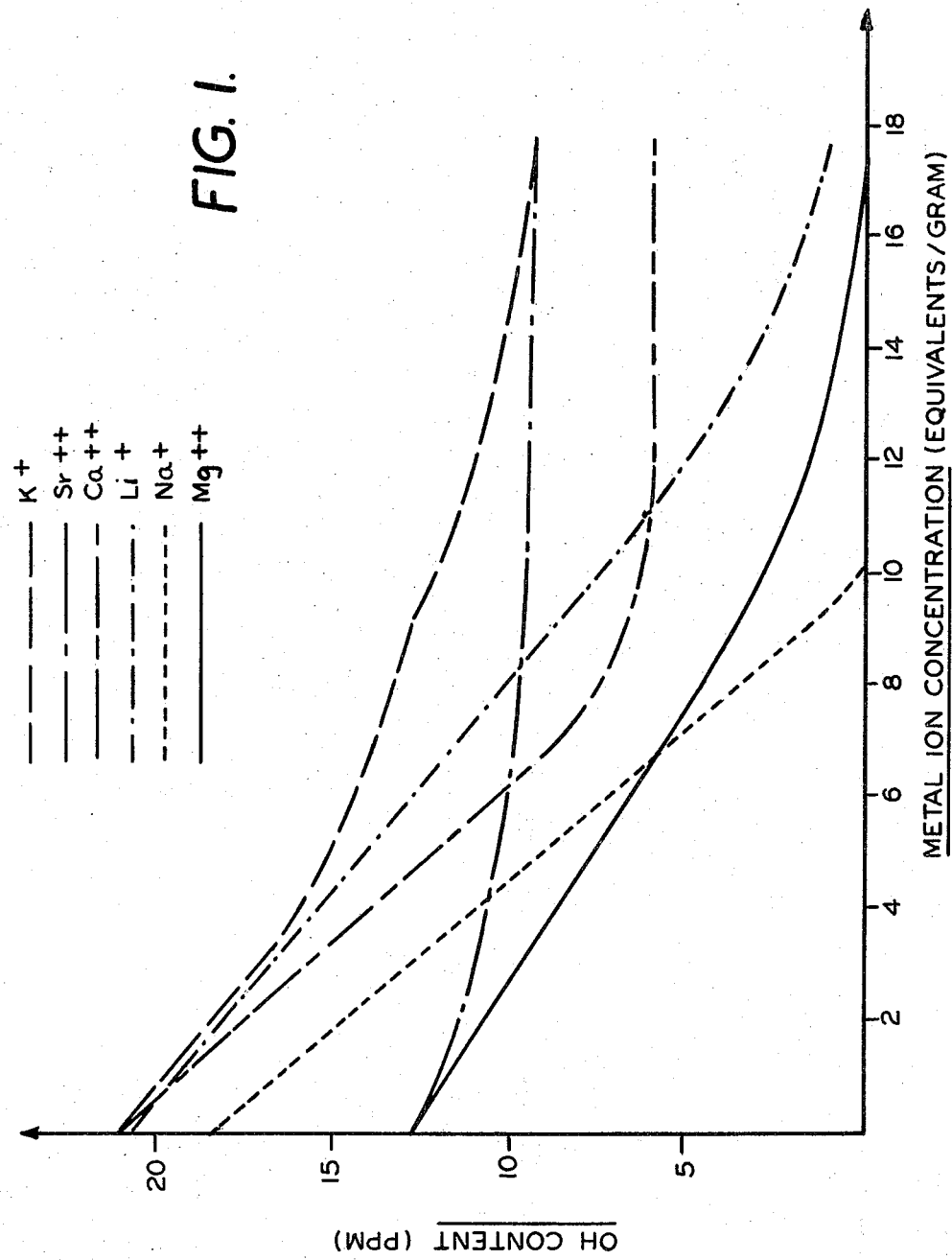
FIG. 1 is a graph showing the decrease in OH content in relation to metal ion concentration.

The quartz crystal granules are advantageously mixed with the salt or salt mixture prior to introduction into the reaction chamber. Such mixing, however, may also be performed within the reaction chamber itself. It has been found especially desirable to add a salt solution to the entire batch of quartz crystal granules and then dry it at a temperature of less than 500°C., prior to its entry into the reaction chamber. Instead of adding a salt solution to the entire batch of quartz crystal granules, it is also advantageous to add a more highly concentrated salt solution to a portion of the total batch of quartz crystal granules and dry it and then mix it with the rest of the untreated quartz crystal granules, so that, on the whole, the desired salt concentration corresponding to the previously determined OH content of the quartz crystal granules will be present.

The gas-flooding step of the process, which follows the stirring of the salt-doped quartz crystal granules at elevated temperature is performed advantageously, according to a further feature of the invention, on the basis of the counterflow principle.

Sodium fluoride, sodium choride, sodium bromide, sodium nitrate, lithium chloride, potassium chloride, magnesium chloride, calcium chloride, strontium chloride and silver nitrate, or a mixture of two or more such salts, have proven to be especially desirable for the doping of the quartz crystal granules. These are salts whose cation has a high diffusivity into the quartz crystal, the choice of the anion being free, according to the desired vapor pressure. It is not essential to the process of the invention, therefore, that halides be used, although particularly good results are achieved with sodium chloride on the basis of its thermodynamic characteristics.

The stirring of the salt-doped quartz crystal granules at high temperature, advantageously at a temperature of more than 1,000°C., causes a partial pressure to form, corresponding to the vapor pressure of the added salt, and a uniform distribution among the granules is assured. During this high-temperature treatment, an ion exchange takes place between the protons of the hydroxyl radicals present in the quartz crystal granules and the cations of the added salt. The liberated protons form an acid with the anions of the added salt; if halides are used, the liberated protons form the corresponding hydrohalic acid which escapes in the form of a gas.

The quart crystal granules stirred at elevated temperature are then flooded with a water vapor-free gas, again at elevated temperature. This flooding is performed for the purpose of freeing the quartz crystal granules of traces of vaporized salt, because this salt vapor would condense onto the granules upon cooling, and this would lead to the formation of bubbles in the quartz glass during the melting process. Oxygen has proven effective as the flooding gas. Flooding with nitrogen, however, has proven to be especially advantageous because experiments have shown that in this manner the bubble content of the fused quartz glass will be appreciably lower even than that achieved with oxygen flooding.

It is possible by the process of the invention to reduce greatly the hydroxyl radical content of quartz crystal granules and to produce a bubble-free and OH-free quartz glass in a simple manner by a melting process. For example, the OH content of a batch of quartz crystal granules, which had previously been determined to average 20 ppm (parts per million), was able to be diminished to a value ranging from 0 to 2 ppm.

The diminution of the OH content of a batch of quartz crystal granules in relation to the metal ion concentration is represented in FIG. 1. In each case, one of a variety of metal chlorides (sodium chloride, magnesium chloride, lithium chloride, calcium chloride, strontium chloride, potassium chloride) was added to a predetermined equal amount of a batch of OH-containing rock crystal granules, and the mixture was stirred for 1 hour at 1,280°C. The curves clearly indicate that the OH content diminishes as the metal ion concentration increases. In order to render free of hydroxyl radicals a batch of quartz crystal granules whose previously determined OH content amounts to 18 ppm, for example, such an amount of sodium chloride is to be added to this batch of OH-containing rock crystal granules that the sodium ion concentration will amount to $11.10^{-8}$ Val/g, and this mixture will be stirred for one hour at a temperature of 1,280°C.

Figure 2:
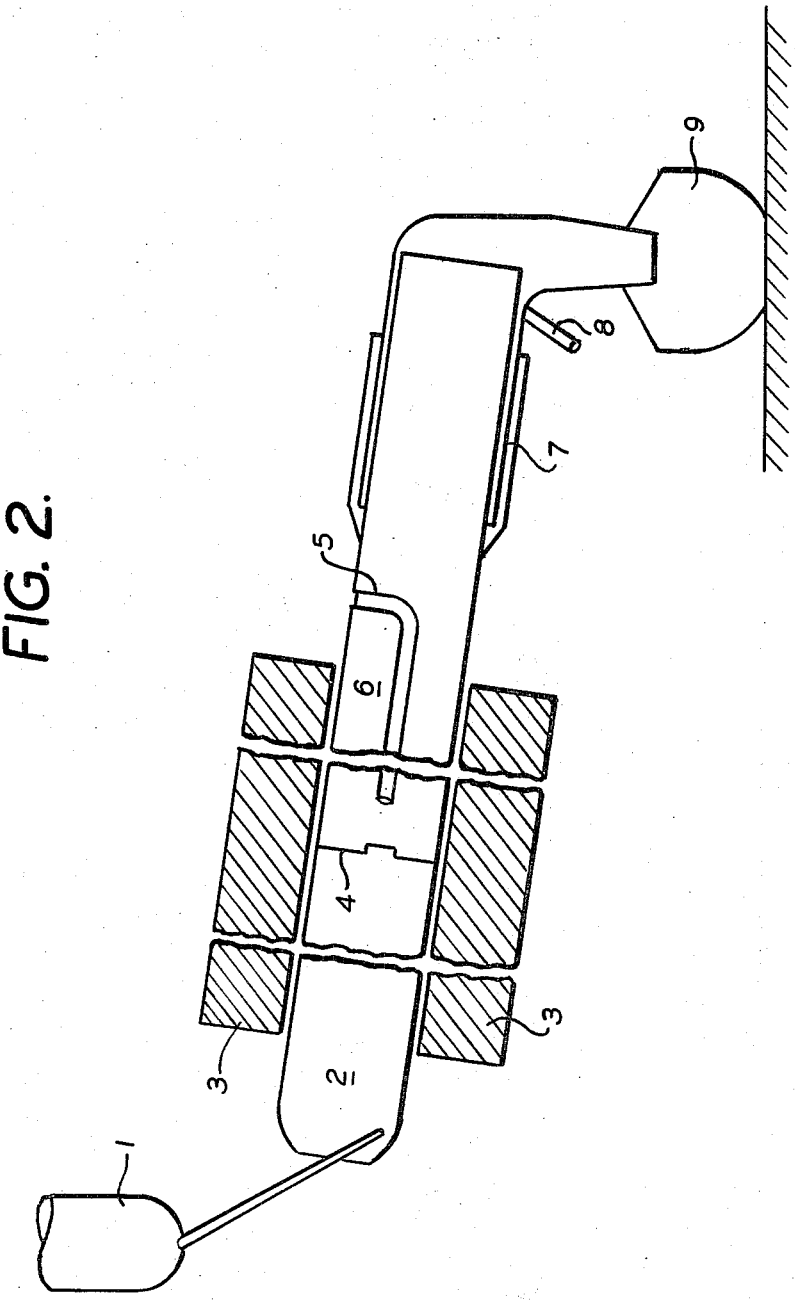
FIG. 2 is a side view partly in cross-section of apparatus for carrying out the process of the invention.

An apparatus which has proven to be especially good for the performance of the process of the invention is represented diagrammatically in FIG. 2.

Quartz crystal granules containing hydroxyl radicals which has previously been mixed with a salt or a salt mixture is fed through a hopper 1 into a rotary kiln made of quartz glass and equipped with an electrical heating system 3. The rotary kiln has a reaction chamber 2, which is heated to temperature ranging from 800° to 1,700°C, preferably from 900° to 1,400°C., and a flooding chamber 6, which are combined in a single unit.

In the reaction chamber, the OH-containing quartz crystal granules which have been mixed with the salt or salt mixture, that is, doped, are tumbled for at least 30 seconds: for example, they are tumbled for 10 minutes at 1,280°C., if sodium chloride is added. During this tumbling the exchange of the cations of the added salt or salt mixture with the protons present in the quartz crystal granules takes place. The reaction chamber 2 is separated from the flooding chamber 6 by a partition 4.

The two chambers communicate with one another only through an aperture in the partition 4, which in the operating state is covered with granules. By this artifice a trapping action is achieved, so that the tumbled granules can enter into the flooding chamber 6, but no substantial amount of the salt vapor formed in the reaction chamber will be able to do so. By this arrangement the salt vapor is obliged to flow against the granules entering through the hopper and to condense thereon. A natural counterflow is thus developed.

The protons of the quartz crystal granules, being liberated by the high-temperature diffusion of the cations of the salt or salt mixture, form together with the anions of the salt or salt mixture an acid which escapes in gaseous form through the opening through which the feed hopper extends into the reaction chamber.

The quartz crystal granules which migrate in the hot zone of the rotary kiln through the aperture in the partition 4 are contaminated with traces of the salt vapor which would condense upon the granules upon cooling, and this would result in undesired formation of bubbles in the quartz glass during the later melting process. Therefore, in accordance with a further development feature of the invention, the quartz crystal granules emerging from the aperture in the partition wall are flooded with a counterflow of water vapor-free gas, such as dry oxygen or nitrogen, at a temperature ranging from 800° to 1,700°C., preferably ranging from 900° to 1,400°C.

The flooding gas is delivered through the connection 8 and leaves the flooding chamber through the discharge tube 5. The granules then leave the flooding chamber through a rotary fitting 7 and pass, under a water-vapor-free atmosphere, into the schematically indicated melting furnace 9 or they are collected and preserved in gas-tight containers under the same conditions until the melting is performed.

It should be noted that the flooding gas system is such that no outside air can penetrate into the flooding chamber 6 or into the transition zone.

What is claimed is:

1. Process for the manufacture of substantially bubble-free and OH-free amorphous quartz glass from quartz crystal granules having a pre-determined OH content which comprises:

a. doping said quartz crystal granules with a salt or mixture of salts whose cation is selected from the group of lithium, sodium, potassium, magnesium, calcium, strontium and silver, each salt having, at temperatures in the range from 800° to 1,700°C., a vapor pressure of at least 5 mm Hg, in a quantity corresponding at least to the —OH content of said quartz crystal granules, b. stirring the doped quartz crystal granules for a period of at least 30 seconds in a reaction chamber heated to a temperature ranging from 800 to 1,700°C. having an atmosphere enriched with salt vapor, thereby causing a partial pressure to form corresponding to the vapor pressure of said salt, c. flooding the tumbled quartz crystal granules with a water vapor-free gas at a temperature ranging from 800° to 1,700°C., and d. melting the gas-flooded quartz crystal granules under a water vapor-free atmosphere.

2. Process of claim 1 wherein the quartz crystal granules are mixed with the salt or salt mixture prior to introduction into the reaction chamber or therein.

3. Process of claim 1 wherein a salt solution is added to the entire batch of quartz crystal granules, dried at a temperature of less than 500°C., and then transferred into the reaction chamber.

4. Process of claim 1 wherein a portion of the total batch of quartz crystal granules is treated with a more highly concentrated salt solution, dried, mixed with the remainder of the batch of untreated quartz crystal granules, and then introduced into the reaction chamber.

5. Process of claim 1 wherein the quartz crystal granules are mixed with a salt selected from the group of sodium fluoride, sodim bromide, sodium nitrate, lithium chloride, potassium chloride, magnesium chloride, calcium chloride, strontium chloride, silver nitrate, and mixtures of two or more of the foregoing salts, or are treated with a salt solution of one or more of said salts.

6. Process of claim 1 wherein the tumbling of the doped quartz crystal granules and the gas flooding are carried out at temperatures ranging from 900° to 1,400°C.

7. Process of claim 1 wherein gas flooding of the tumbled quartz crystal granules is carried out in counterflow.

8. Process of claim 1 wherein oxygen or nitrogen is used for the gas flooding.

* * * * *